Figure 1:
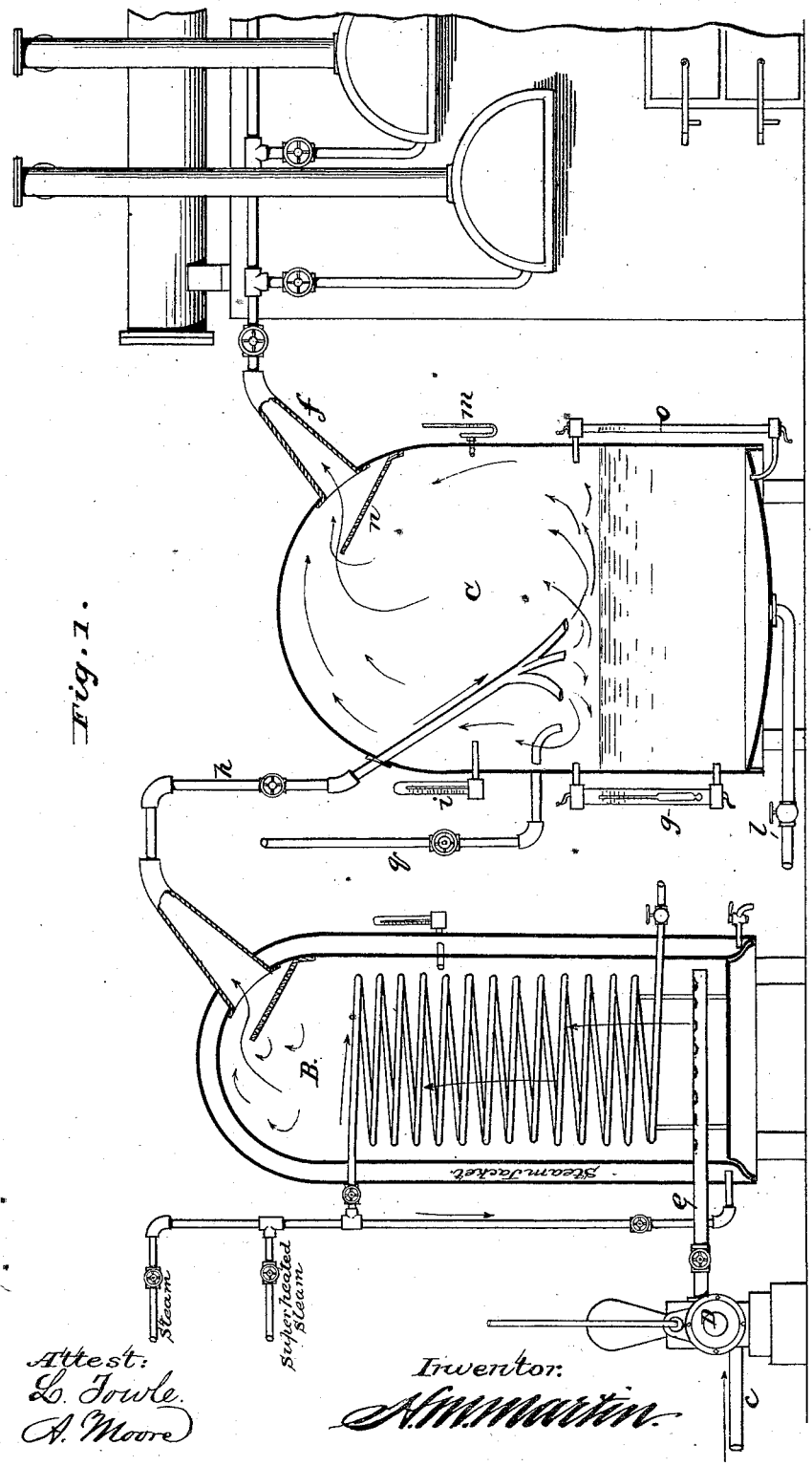

4 Sheets--Sheet 1.

H. M. MARTIN.
Manufacture of Gas.

No. 163,323. Patented May 18, 1875.

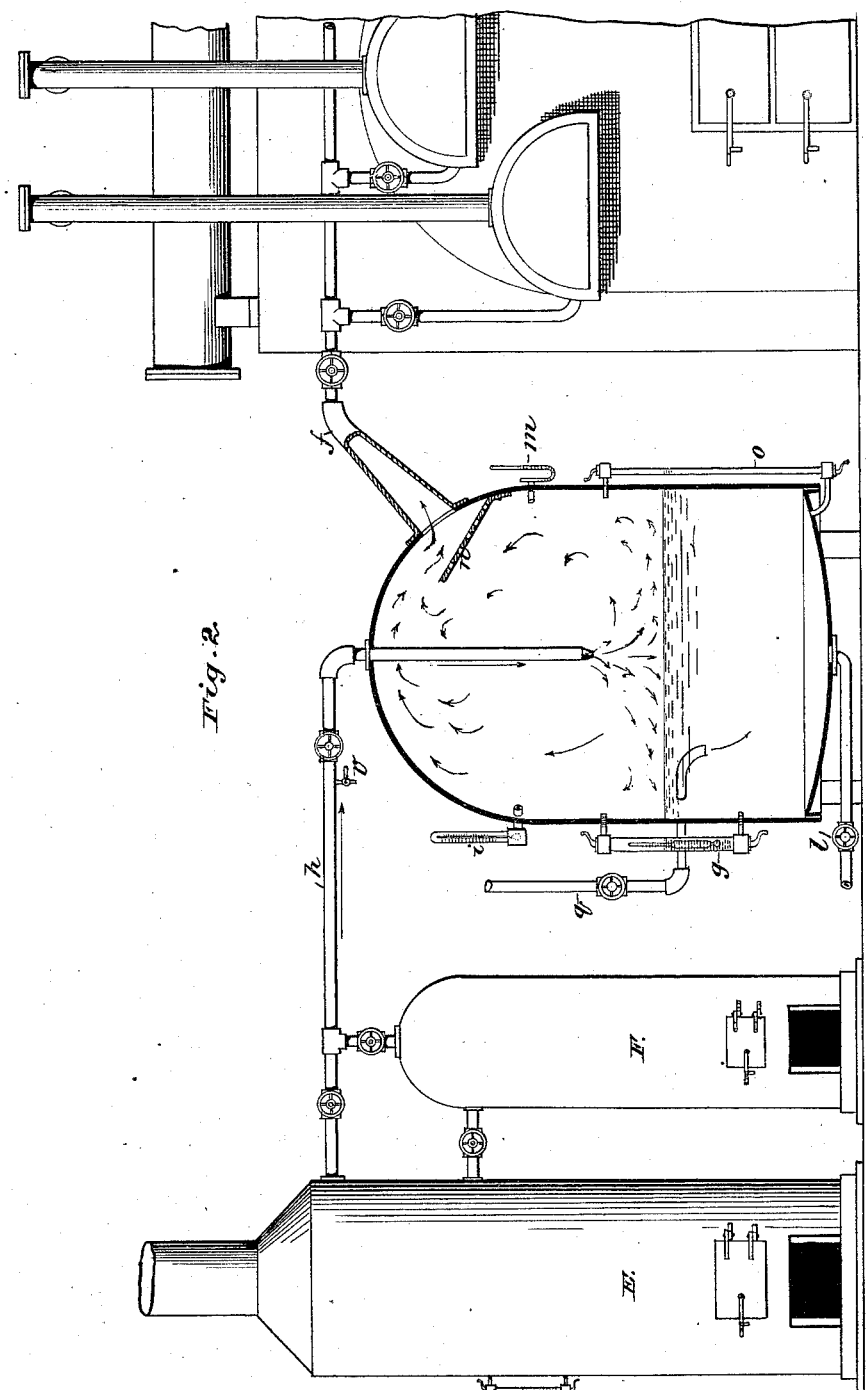

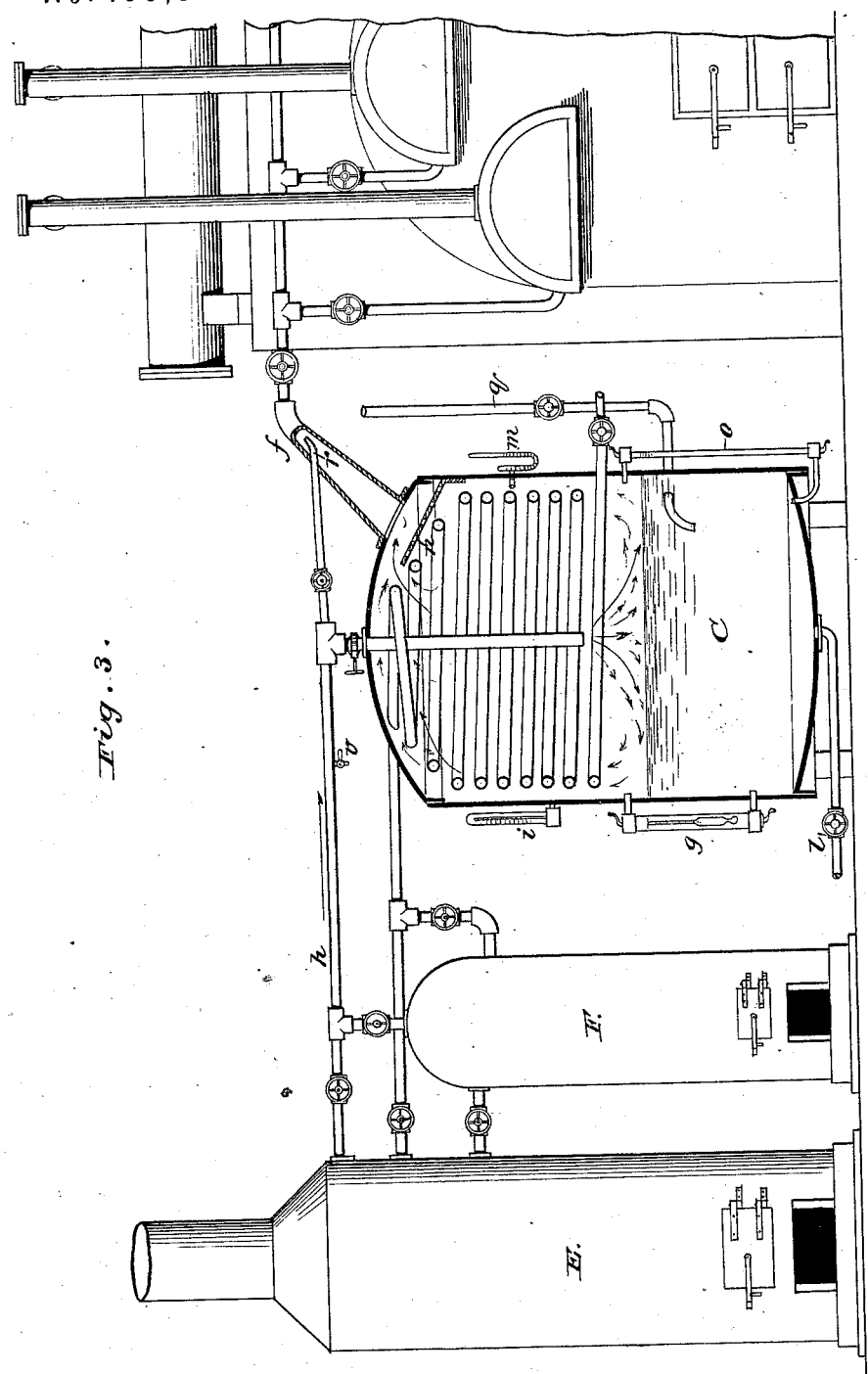

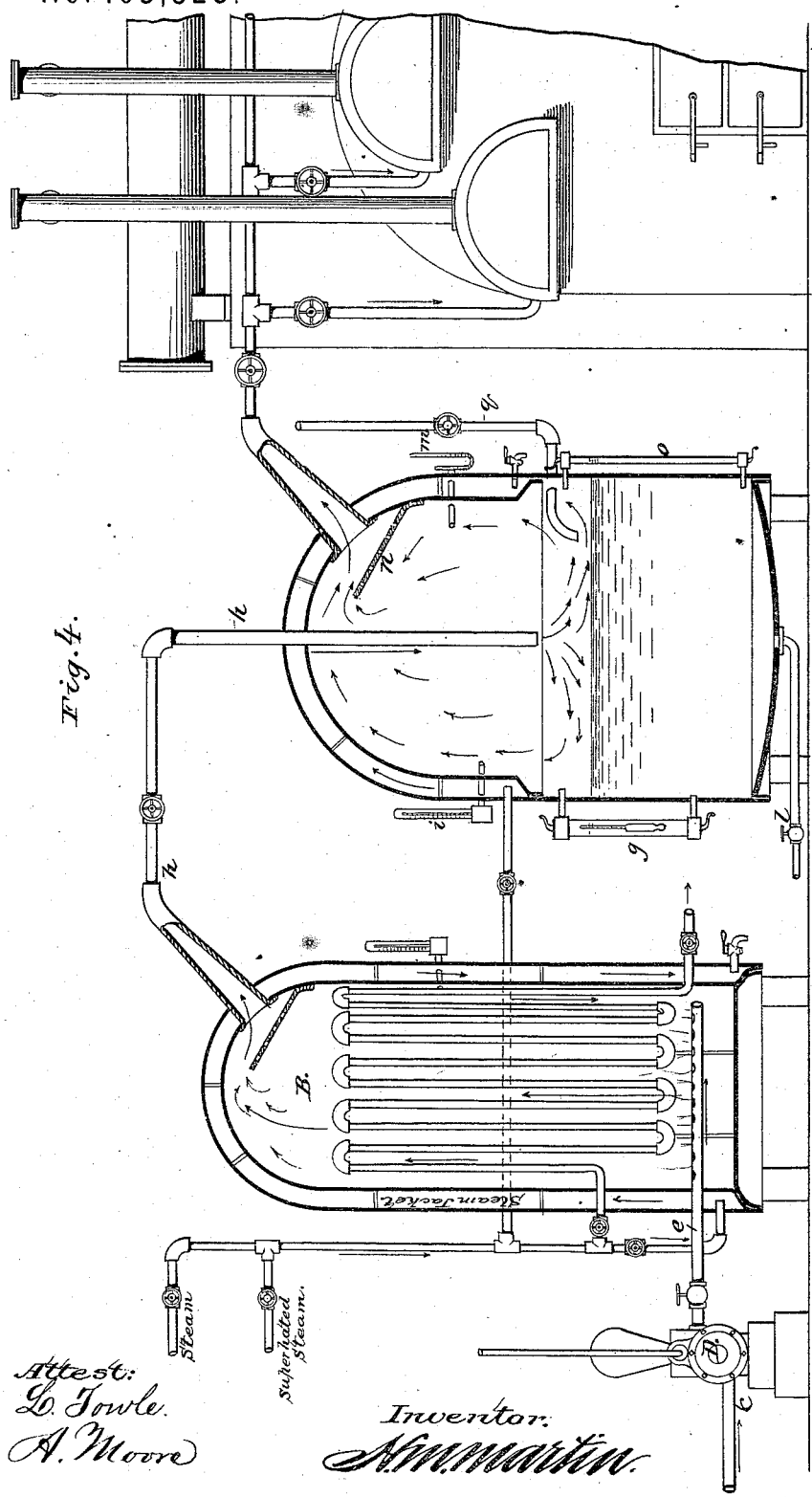

UNITED STATES PATENT OFFICE.

HENRY M. MARTIN, OF NEW YORK, N. Y.

IMPROVEMENT IN THE MANUFACTURE OF GAS.

Specification forming part of Letters Patent No. 163,323, dated May 18, 1875; application filed May 5, 1875.

CASE A.

*To all whom it may concern:*

Be it known that I, HENRY M. MARTIN, of New York city, in the county of New York and State of New York, have invented certain new and useful Improvements in the Manufacture of Gas; and I do hereby declare that the following is a full, clear, and exact description thereof, which will enable others skilled in the art to which it pertains to make and use the same, reference being had to the accompanying drawing, and to the letters of reference marked thereon, which form a part of this specification.

Liquids give off vapors rapidly when they are heated to what is called the boiling-point, the density of the vapors being proportioned to the pressure at which the boiling takes place. The vapors in this case are, however, always dense, and admit of rarefaction only to a certain extent by the application of heat. When volatile liquids are brought in contact with dry aeriform fluids they give off vapors at all temperatures, even far below the boiling-point. When the temperature of the volatile liquid is below the boiling-point and the temperature of the aeriform fluid which strikes its surface is only slightly above that of the liquid very attenuated or light vapors are evolved. This process is generally known as gradual evaporation. The amount of evaporation and the consequent density of the vapors will, for a definite liquid, depend upon the heat and dryness of the aeriform body that strikes it, and upon the extent of surface exposed. Taking advantage of these principles, I am able by my invention to produce from volatile hydrocarbons, of any density or boiling-point, vapors of uniform density. This is very important in the manufacture of gas. Heretofore gas has been made from hydrocarbons by one of the following processes, viz: By distilling off the vapors at the boiling-point and subjecting it to a high heat alone, or mixed with other gases or vapors. The operation is difficult to control, and frequently there is a large deposit of carbon in the highly-heated retort, resulting in great loss of the enriching part of the hydrocarbon, and also a deposit of dead oil, which does not vaporize. Another method is to spray the hydrocarbon into a hot retort. This also gives rise to a deposit of carbon, and a portion passes off as volatile oil not decomposed, which will condense in pipes and meters. A third method is that of passing a fixed gas or air through a hydrocarbon liquid, and thus completely charging the gas or the aeriform fluid with vapor and liquid in fine particles; but as the density of the hydrocarbon is constantly changing, by the action of the gas or air passing through it, the degree of carbureting or saturation is constantly changing, and the gas produced is not of uniform quality — a very serious objection to the use of this method.

The object of this invention is to evaporate hydrocarbon or other gas-evolving substance rich in carbon, and manufacture a gas to be used alone for illuminating or heating purposes, or to be mixed with other gas or gases; and the invention consists in forcing or bringing from any appropriate source a gas or fluid evolved from any substance capable of producing a gas or fluid, which, when united by heat with hydrocarbon, will form an illuminating-gas, or a gas for heating and forcing or bringing such a gas or fluid into a heater, where it is dried and heated to any desired degree; then bringing this heated gas or fluid into contact with the surface of hydrocarbon, not otherwise heated, in a closed vessel, so that the difference in temperature of the entering gas or fluid and the hydrocarbon will produce a vapor from the latter, which, mingling with the former, will enrich the same, and be carried by it into a heated retort, through which the mixture passes, and in which it is converted into a fixed gas.

In the annexed drawings I have shown two forms of apparatus for carrying my process into effect.

Figure I is a view in section, showing the form of apparatus employed, when a gas is forced into contact with the hydrocarbon. Fig. II is a view also in section, showing the form of apparatus employed when steam or superheated steam is to be brought into contact with the hydrocarbon. Figs. 3 and 4 are views in section, showing a modification by which my process can be carried into effect.

In Fig. 1, D designates a pump or forcing-engine, which is actuated by any convenient power. Gas from any appropriate source is drawn into the engine D through a pipe, c, and then forced into the heater B through a pipe, e, provided with a suitable valve. The heater B is preferably made in cylindrical form, may be covered by asbestus or other non-conducting material, and is heated in any convenient manner. I prefer steam, however, for the purpose, as by its use the temperature of the heater may be regulated with ease and certainty. Steam or superheated steam is admitted to the internal coils, pipes, &c., or to external jackets or chambers, by means of suitable pipes provided with valves. The heater is also provided with a thermometer, so that the temperature may be recognized and controlled, and thus the gas or fluid entering may be brought to any desired temperature to correspond to the density of the liquid in the vessel C.

Substances such as the heavy lubricating-oils require of course a greater heat to vaporize them than the lighter hydrocarbons, and the heat of the entering fluid should range for each substance operated upon from the vaporizing-point of such substance to or above its boiling-point.

In the manufacture of gas this heat can be ascertained with ease and certainty by conducting, by means of a small pipe, a portion of the gas directly from the main over the retort to the well-known Lowe's jet photometer, located in sight of the still.

Through the heater B the gas or other fluid passes by means of a pipe, h, which is provided with test-cock v, Fig. 2, to be used when steam is employed to test its dryness, into the vessel C, which is a closed vessel containing a hydrocarbon, having a suitable hydrocarbon supply-pipe, q, and provided with a thermometer, i, hydrometer g, gage-glass o, and pressure-gage m, waste-cock l, and a man-hole.

The gas or other fluid is impinged upon the surface of the hydrocarbon, which is not heated below its surface, but the direct contact of the hot gas or fluid with the surface is relied upon to produce the required vapor. The gas or vapor thus charged with hydrocarbon passes from the vessel C through a pipe, f, inclosed in a steam-jacket, or, protected by some non-conducting substance, into a bench of heated retorts of any suitable construction, where the mixture is converted into a fixed gas. All the pipes entering and leading from the vessel C, and their connections, are provided with suitable valves. Before the mouth of the exit-pipe f in vessel C is a projection or screen, n, the function of which is to divert the current of gas or other fluid and vapor, and cause them to take a circuitous path before leaving the vessel, thus insuring a thorough commingling. To insure the conversion of the mixture into a fixed gas in the retorts these may be chambered so as to subject it longer to the influence of the heat.

In Fig. 2 I show suitable pipes and valves for conveying either steam direct or super-heated steam into the vessel C and upon the surface of the hydrocarbon liquid contained therein. With the exception of the boiler E and superheater F, the remainder of the apparatus is essentially the same as that shown in Fig. 1.

When steam is used the resultant mingled vapor and steam can be treated in two ways in the retort: first, at a very high heat, where the vapor and steam become decomposed, and oxygen is liberated from the steam, setting hydrogen free, the oxygen uniting with a portion of the carbon to form CO and $CO_2$; second, at a red heat, sufficient to decompose the hydrocarbon vapors, but not to decompose the steam, the steam after leaving the retorts parting from the hydrocarbon-gas by condensation in a suitable scrubber. Of course no pump is required when steam is used.

In countries where crude petroleum is cheap and abundant, but no refineries exist, the process can be carried on with great economy, as follows: The crude petroleum in the vessel C is exposed to the action of the hot entering fluid, which will carry off all the dangerous and volatile hydrides, and the most volatile olefines, which will produce a brilliant gas of low specific gravity; and after having thus utilized these dangerous products it will leave a safe burning fluid of any desired gravity or a heavy lubricating oil. This can be accomplished by having the entering fluid at a temperature of about 100°, and increasing the temperature with the density of the materials operated upon.

To make the operation continuous it is only necessary to have two stills, each having connection with a heater provided with suitable valves.

In Figs. 3 and 4 I have shown a modification by which my process may be carried out.

To create the equivalent of a heated atmosphere of any designated temperature in the interior of the upper portion of the vessel C, containing the hydrocarbon, which will produce evaporation, either alone or in conjunction with entering heated fluid, and will also prevent any condensation of vapors or steam, when steam is used, I provide the upper portion of the still with means for heating the same. The still may be heated in any convenient manner, but I prefer heating it by means of a steam jacket or coil, as by such means the heat may be maintained, and also graduated to correspond to the density of the liquid in the still.

Sometimes I prefer to carry off the vapors of the hydrocarbon contained in the still without admixture with any other fluid. In this case I exclude admission of steam or gas, and permit vapors to be generated from the hydrocarbon simply by the heat of the upper portion of the containing-vessel. As a carrier is lacking in this case, however, it will sometimes be necessary to provide a suitable exhaust.

This may be either a steam-jet exhaust, such as is shown at r, Fig. 3, or a fan, or their equivalent.

It is to be observed that my method of producing vapors from volatile hydrocarbons enables the gas-manufacturer to introduce the exact quantity required for his purpose.

The gas produced can always be brought to any required standard or candle-power, and the deposition of gas-carbon prevented. This is especially desirable under the conditions now required.

The gas materials that must be used are very variable. Some of them which are cheap produce a very large amount of gas, but below the standard required for consumption. They vary very much. My invention enables the manufacturer to add the exact amount of enriching material to bring the gas to the commercial standard.

Having thus fully described my invention, what I desire to claim, and secure by Letters Patent, is—

1. The process of manufacturing an illuminating-gas, which consists in bringing an aeriform fluid into contact in a closed vessel with the surface of a liquid hydrocarbon not otherwise heated, and then passing the resultant vapors through a hot retort, where they are converted into a fixed gas, substantially as described.

2. The process herein described for treating hydrocarbons in the manufacture of illuminating or heating gas, consisting in carying off, by means of a heated fluid, the constituents of the hydrocarbon down to any desired specific gravity, and converting them into a fixed gas leaving an oil of any desired density in the vessel, as set forth.

3. The combination of a still provided with means for heating its upper portion with a fixing-retort.

In testimony that I claim the foregoing as my own I affix my signature in presence of two witnesses.

H. M. MARTIN.

Witnesses:
THOMAS H. DUNHAMS,
L. TOWLE.